United States Patent [19]

Login

[11] 4,111,816

[45] Sep. 5, 1978

[54] PHOSPHORUS-CONTAINING POLYESTER AND SIZE COMPOSITIONS

[75] Inventor: Robert Bernard Login, Woodhaven, Mich.

[73] Assignee: BASF Wyandotte Corporation, Wyandotte, Mich.

[21] Appl. No.: 810,233

[22] Filed: Jun. 27, 1977

Related U.S. Application Data

[62] Division of Ser. No. 727,991, Sep. 30, 1976.

[51] Int. Cl.$^2$ ........................................... D06M 13/26
[52] U.S. Cl. ..................... 252/8.6; 8/115.6; 260/75 P; 427/390 R; 428/276; 528/287
[58] Field of Search ......................... 252/8.6, DIG. 17; 8/115.6; 260/75 P; 427/390 R; 428/276

[56] References Cited

U.S. PATENT DOCUMENTS

| | | | |
|---|---|---|---|
| 3,028,366 | 4/1962 | Engle et al. | 260/75 P |
| 3,396,149 | 8/1968 | Roedel et al. | 260/75 P |
| 3,441,540 | 4/1969 | Muller et al. | 260/75 P |
| 3,595,835 | 7/1971 | Pilz et al. | 260/75 P |
| 3,694,257 | 9/1972 | Dumont | 252/8.6 |

*Primary Examiner*—William E. Schulz
*Attorney, Agent, or Firm*—Andrew E. Pierce; Bernhard R. Swick; Robert E. Dunn

[57] ABSTRACT

There are disclosed a phosphorus-containing polyester and size compositions especially useful for sizing spun and continuous filament yarn produced from hydrophobic fibers and useful in protecting these fibers from abrasion during the weaving process. When the size is used alone or in mixtures with conventional size agents such as starches and polyvinyl alcohol, improved adhesion is obtained to hydrophobic fibers or blends thereof with cotton or other hydrophilic fibers. Polyester, polypropylene and polyamide and other fibers are effectively sized with the size compositions of the invention. The polyester consists of a branched chain phosphorus-containing polymer which is the reaction product of at least one dicarboxylic reactant, at least one diol or polyoxyalkylene glycol and a phosphorus acid reactant selected from the class consisting of phosphorus pentoxide, phosphoric acid and mixtures thereof.

14 Claims, No Drawings

PHOSPHORUS-CONTAINING POLYESTER AND SIZE COMPOSITIONS

This is a division of application Ser. No. 727,991, filed Sept. 30, 1976.

BACKGROUND OF THE INVENTION

1. Field of the Invention

This invention relates to novel polyester compositions and to sizing compositions utilizing said compositions as binders for a fibrous article such as a spun or continuous filament hydrophobic textile yarn.

2. Description of the Prior Art

Prior to the weaving operation a continuous filament polyester warp yarn is usually given a twist of about 5 to 15 turns per inch and treated with a sizing composition which binds the filaments of the yarn together so as to strengthen the yarn by rendering it more resistant to abrasive forces to which it is exposed during the subsequent weaving operation. It is less expensive to size the warp yarn than to impart a high degree of twist to the yarn in order to reduce the breaking tendency during weaving. Sizing materials, besides conferring on the yarn abrasion resistance, must have the additional properties of elasticity and flexibility with low tackiness and be characterized as easily removed subsequent to the weaving operation so as to return the yarn to its unsized state in which dyeing treatments are often performed on the woven fabric. In addition, a size solution should dry rapidly and uniformly after application to the yarn without delayed set or a tacky surface.

It is common in the Textile Industry to use as sizing materials easily removed high molecular weight synthetic and natural polymers such as polyvinyl alcohol and starch but with the advent of synthetic fibers such as polyamide and polypropylene and especially polyester fibers based upon poly(ethylene terephthalate) yarns made with synthetic fibers or those containing synthetic fibers in blends with natural fibers such as cotton are not suitably sized (because of poor adhesion thereto) with conventional natural polymer sizing materials but require a sizing material having suitable adhesion to the synthetic fibers.

Heretofore, phosphorus-containing polyester compositions have not been utilized as a sizing material either alone or in combination with other high molecular weight natural polymers such as starch. Instead, copolyesters containing the residue of a 5-sodio-sulfoisophthalic acid as disclosed in U.S. Pat. No. 3,546,008 have been used as sizing compositions on textile yarn such as poly(ethylene terephthalate). Such sizing compositions have found acceptance in the Textile Industry but difficulty has been experienced in that such sizes are difficult to remove from the fibers subsequent to the weaving operation by the usual dilute caustic solutions and, additionally, such size compositions are expensive both when used alone and even when blended with conventional sizing materials such as starch. Such sizing compositions also form such tough films on the fibers that difficulty can result during the slashing operation when the sized warp yarns are separated.

Recently, low molecular weight phosphorus-containing compositions, which are liquids at ambient temperatures and are suitable for application to metal surfaces as siccative protective coatings, have been disclosed in U.S. Pat. No. 3,415,788. These are used as aids to the inhibition of corrosion on such metal articles. Such phosphorus-containing protective coating compositions, which are soluble in hydrocarbon solvents, are prepared by reacting a benzene polycarboxylic reactant, preferably trimellitic anhydride, having at least two carboxylic groups with a polyhydroxy compound selected from the class consisting of polyhydric alcohols and polyhydric phenols, together with a phosphorus acid reactant selected from the group consisting of phosphorus pentoxide, phosphoric acid and mixtures thereof. It is also known from U.S. Pat. No. 3,396,149 (and corresponding British Pat. No. 963,966) that the preparation of mixed polyesters suitable as additives for incorporation during the melt spinning of fibers from diglycol esters of aromatic dicarboxylic acids wherein the carboxylic acid groups are 4 C atoms apart can be catalyzed by phosphoric acid. The polyesters of aliphatic glycols and the above aromatic dicarboxylic acid esters are first prepared by transesterification. The resulting ester is then condensed in the presence of added glycol and 2 to 15 percent phosphoric acid. The mixed polyester is said to have very low tensile strength and to be useful for modifying poly(ethylene terephthalate) to improve dyeability with basic dyes and dispersion dyes.

Although phosphorus-containing polyester compositions are known from the prior art, it is unexpected that the water-dispersible polyesters of the invention can be used in sizing synthetic yarn such as poly(ethylene terephthalate) yarn either used alone or in combination with starch or modified starches such as carboxylated starches. The polyester composition of this invention is prepared in the water-insoluble free acid form. In order to render such composition water-dispersible, one need only neutralize said free acid. Unexpectedly upon neutralization of the free acid form, the polyester becomes moisture sensitive as well as water-dispersible, i.e., under conditions of moderate humidity, a plasticizing effect is noted. Said phosphorus-containing polyesters are particularly suitable as size compositions because of this plasticizing effect which is particularly evident under conditions of 65–70% relative humidity and 70°–75° F. These polyesters are also readily removed by soaking in the usual caustic solutions utilized to remove size and clean the woven textiles subsequent to the weaving operation.

SUMMARY OF THE INVENTION

It has now been discovered that a novel polyester useful for sizing a hydrophobic textile yarn or blends with natural fibers, particularly yarn containing spun or continuous filament polyester derived textile yarn, can be prepared by first reacting a phosphorus acid reactant with at least one diol or polyoxyalkylene glycol or mixture thereof and, subsequently, condensing the reaction product obtained with a polycarboxylic reactant having at least two carboxylic groups. A moderate molecular weight branched chain polyester is obtained which is a solid at ambient temperatures and contains repeating carbonyl-oxy units and phosphate units wherein said units are an integral part of the polymer chain. Such polyesters are generally prepared in the free acid form and are usable as such or easily converted to water-dispersible, moisture sensitive materials by neutralizing or partially neutralizing the free acid with a basic material such as an alkali metal carbonate, alkali metal hydroxide, ammonia or an amine.

The polyester compositions of the invention can be used as a sizing agent either as a replacement for or in admixture with, or in successive applications following the application of conventional size compositions such as starch, modified starch, polyvinyl alcohol, polyacrylates, polyacrylic acid and polyvinyl acetate copolymers.

DETAILED DESCRIPTION OF THE INVENTION

This invention relates to a phosphorus-containing branched chain polyester, polyester size compositions and a method of sizing hydrophobic synthetic yarns with sizing compositions which are especially adaped for use thereon. The method and compositions of this invention have particular utility in sizing polypropylene and polyester yarns as well as polyamide and polyacrylic yarns.

Sizing of spun yarns has as its primary object the adsorption of a film-forming material into and on the fibers comprising the spun yarn which may be in the form of hanks or warps. This treatment imparts to the spun yarn increased tensile strength and resistance to the abrasive action of the parts of the loom that are employed in the manufacturing of woven fabric from the yarn. Thus, adequate sizing results in increased weaving efficiency by reducing the number of breaks in the warp, clinging of the ends of the warp in the shedding motion of the loom, reduction of fiber shedding at the loom and facilitates proper operation of the stop motion and other functions of the loom. In addition, adequate sizing improves the quality of the fabric produced by reducing the number of fabric defects due to distortion of weave, knees, accumulation of excessive lint fiber or fuzz balls which are subsequently woven into the fabric, knots from excessive warp breaks, drawbacks and filling floats.

The sizing process consists of passing the warp through a size box or trough containing a film former, removing excessive film former with squeeze rolls and drying over heated cylinders or in an oven. After drying the warp, the individual ends are separated from one another in a so-called "slashing" step by a series of bars known as split rods or lease rods. A size which has little adhesion to the yarn will flake off or shed at the lease rods. On the other hand, a size which binds the yarn too firmly together will cause excessive end or yarn breakage. The polyester size of the invention combines the advantages of excellent adhesion to the yarn and moderate binding strength of individual yarn bundles to each other. Thus separation of the yarn at the lease rods is facilitated. The sized warp after separation at the lease rods is wound on a loom beam and is then mounted on a loom and the individual ends drawn into the desired pattern.

The most widely used material for a sizing film former for spun yarn is starch because of its economy, ready availability in various viscosity ranges and effectiveness. With the introduction of various hydrophobic synthetic fibers such as the polyolefins, polyamides, polyesters, and polyacrylics, new sizing problems were created. Adhesion of conventional starch sizing materials to these fibers was poor and major problems developed due to inadequately protected yarn resulting in low weaving efficiency and poor fabric quality. Similar results were obtained using mixtures of hydrophobic fibers with such natural fibers as cotton, wool and the hydrophilic synthetic fibers such as cellulose acetate, viscose, etc.

It is therefore a principal object of this invention to provide improved compositions and methods for sizing hydrophobic synthetic yarns. More specifically, it is an object of this invention to provide an improved method for the sizing of hydrophobic synthetic yarns. Further objects and advantages will be indicated in the following detailed specification.

In preparing the novel polyester size composition of the invention, at least one diol or polyoxyalkylene glycol is generally first combined with at least one phosphorus acid reactant under conditions in which the diol or polyoxyalkylene glycol is present in large excess so as to provide a reaction product of a mixture of an excess of the diol or polyoxyalkylene glycol and the corresponding mono- and diphosphate esters. Subsequently, at least one dicarboxylic reactant is added to said reaction product and the mixture heated to facilitate condensation. The phosphate group containing polyester obtained is a viscous liquid which can be cooled to form a very hard, strong, transparent plastic that readily disperses, for instance, in an aqueous solution of a dilute base such as an aqueous solution of sodium bicarbonate. Other alkali metal carbonates can be used to disperse the polyester of the invention. Carbonates of lithium, sodium, potassium, rubidium and cesium are useful. The corresponding alkali metal hydroxides are also useful. Other bases such as amines or ammonia are also useful. Illustrative amines are isopropylamine, n-propylamine, ethylamine and triethanolamine.

The phosphorus acid reactant utilized is defined as phosphorus pentoxide, phosphoric acid or mixtures thereof. Phosphoric acid is further defined to include pyrophosphoric acid and metaphosphoric acid as well as the various polyphosphoric acids, all of which are readily formed by mixing the proper amounts of water with phosphorus pentoxide. Aqueous solutions of phosphoric acid such as commercial 85% phosphoric acid can be used; the lower concentration limit being limited as a practical matter by the compatibility and reactivity of the reactant.

In preparing the reaction product of the phosphorus acid reactant such as phosphorus pentoxide with a polyoxyalkylene glycol such as diethylene glycol, it has been found suitable to conduct the reaction in a first stage at ambient temperature by either slowly adding the phosphorus pentoxide to the glycol or alternatively dispersing the phosphorus pentoxide in an inert solvent such as methylene chloride or benzene and adding it to the glycol. The corresponding mono- and diphosphate esters are readily obtained without the necessity of heating the mixture or using a catalyst.

During the second stage of the process to produce the phosphorus-containing polyester of the invention, the use of heat is involved, water being removed as a by-product during the reaction. In this stage, at least one dicarboxylic reactant such as isophthalic acid is reacted with the excess glycol present and the mono- and diphosphate esters formed previously. The conditions of heating are generally at a temperature of from about 150° C. to 250° C. over a time of about 1 hour to about 8 hours or until the desired acid number is reached.

The reaction in the second stage is conducted so as to obtain a carboxylic acid number generally between about 2 to about 24, preferably about 5 to about 15 and most preferably about 8 to about 12. By the method of end group analysis, equivalent weight of one molecule of the polyester can be estimated from the measured carboxylic acid number. Thus where, for instance, the carboxylic acid number is determined to be 5, the equivalent weight of one molecule can be calculated as follows, further assuming that there is one carboxylic group on each molecule.

The measured acid number (5) in milligrams of potassium hydroxide required to neutralize 1 gram of polyester divided by the molecular weight of the potassium hydroxide equals 0.089 milliequivalents per gram of polyester. The number of grams of polyester ($x$) required to neutralize one equivalent of potassium hydroxide can be derived from the following equation:

$$\frac{1}{x} = \frac{.000089}{1}$$

Solving for $x$, it is found that about 11,000 grams of polyester are required. This corresponds to a molecular weight of about 11,000 where it is assumed that each polyester chain has only one carboxylic group. The molecular weight range corresponding to an acid number range of about 5 to about 15 is about 4,000 to about 11,000.

In an exemplary preparation of the phosphorus-containing polyester size composition of the invention, one-tenth mole of phosphorus pentoxide was added to one and one-tenth mole of diethylene glycol by successive additions of the phosphorus pentoxide over a period of about 1 to about 3 hours at a temperature of about 25° C. to about 45° C. Subsequently, 0.9 mole of isophthalic acid was reacted with the excess glycol present and the reaction product obtained at a reaction temperature of about 150° C. to 225° C. over a time of about 1 hour to about 8 hours. Vacuum distillation was utilized to promote removal of the water of condensation during the final stages of the reaction. The polyesterification reaction was conducted under a nitrogen atmosphere or with a nitrogen sparge as is conventional in the preparation of polyesters. Upon the mixture reaching the desired carboxylic acid number of about 8 to about 12, the mixture changes in appearance from a fluid transparent liquid to a very viscous transparent liquid. Upon completion of the reaction, the polyester is poured out of the reactor and allowed to cool to a tough solid material.

The branched chain phosphorus-containing polyesters of the invention are prepared in the organic solvent soluble free acid form in which they are not readily dispersible in water but said polyesters can be made easily dispersible in water upon neutralization of the polyester with a base. It is thus possible to disperse the size compositions of the invention in water into which an alkali or volatile base has been added.

Organic solvent solutions of the free acid form of the size compositions of the invention are also useful. While the present day commercial systems for the application of size to warp yarns utilize an aqueous dispersion of a size, the use of low viscosity organic solvent solutions of the size compositions of the invention can result in greater efficiency and improved economy. With organic solvent size solutions, fiber bundle penetration of the size solution is more rapidly attained, fiber finish scumming in the size bath is eliminated, a lower heat setting can be used to dry the applied size thus reducing the possibility of damage to the fiber and yarn and a greater operational speed can be obtained. Useful solvents for the polyester size composition of the invention in the free acid form include hydrocarbon solvents such as toluene, xylene and mineral spirits and oxygenated solvents such as methyl isobutyl ketone, isobutyl alcohol and butyl cellosolve.

While absorbed water acts to plasticize the neutralized form of the polyester of the invention, as previously noted such mechanism does not take place with the free acid form of the polyester of the invention. Where the polyester is used in the free acid form, it is thus necessary to utilize therewith an appropriate plasticizer such as a phthalate ester, for instance, diethyl phthalate or dioctyl phthalate or other compatible plasticizer which can be selected by one skilled in the art to overcome the brittleness of certain forms of the free acid form of the polyester of the invention. Alternatively, the structure of the polyester can be modified within the teachings herein to produce a polyester having greater flexibility, if desired. Thus instead of using as a dicarboxylic reactant only an aromatic acid or corresponding anhydride or ester with a diol, (1) a mixture of a long chain aliphatic dicarboxylic acid (i.e., azelaic acid) or corresponding anhydride or ester can be used together with the aromatic dicarboxylic reactant species and a diol or (2) the above dicarboxylic reactant can be used with a long chain polyoxyalkylene glycol or in admixture with a long chain diol to provide greater flexibility. Water sensitivity is also increased by the use of long chain polyoxyalkylene glycols characterized by water sensitive ether linkages. Suitable long chain aliphatic dicarboxylic acids have carbon chain lengths of about 4 to about 10, preferably 6 to about 10 carbon atoms.

The phosphorus-containing polyester size compositions of the invention generally contain, based upon the sum of the theoretical mole percentages of the other components of said polyester, about 5 to about 15 mole percent of the phosphorus acid reactant; about 45 to about 35 mole percent of at least one dicarboxylic reactant with the remainder being 50 mole percent of at least one diol or polyoxyalkylene glycol.

The ease of aqueous dispersibility of the neutralized form of the phosphorus-containing polyester size composition of the invention is also directly related to the proportion of phosphorus acid reactant or amount of neutralized phosphate group contained in the polyester. It is also possible to increase the dispersibility of such phosphorus-containing polyester size composition by changing the amount and type of diol or polyoxyalkylene glycol to more soluble types.

The polyester compositions of the invention are particularly suitable and represent a material having an ideal combination of properties rendering these polyesters especially useful for sizing hydrophobic fibers. Such polyester compositions which are prepared in the free acid form can be rendered dispersible in water by use of a dilute solution of either a volatile base (i.e., ammonium hydroxide or a volatile amine) or a solution of a fixed alkali as previously described. Where a volatile base is used to disperse the polyester, upon drying the size solution which has been applied to the fiber, the polyester size no longer exhibits the characteristic water-dispersible properties, yet it can be removed readily by subjecting the sized fiber to a dilute solution of a base such as sodium or ammonium hydroxide. Such a size dispersion can be used to produce the so-called "loom finish" in conjunction with a water jet loom.

For use with a water jet loom, a size must meet three basic requirements: The size should be (1) water-dispersible, (2) the dried size film present on the fibers during weaving should be water-repellent throughout the weaving process and (3) the sizing is not rendered non-dispersible by heat treatment during processing but remains easily removable by conventional desizing and scouring treatments wherein aqueous sodium hydroxide or sodium carbonate solutions with or without surfactants are utilized. The polyester size of the invention meets all these requirements and is easily removed by dilute caustic solutions without the use of surfactants.

The polyester size composition of the invention is prepared from an aromatic, aliphatic or cycloaliphatic dicarboxylic reactant such as dicarboxylic acids and esters, their corresponding acyl halides, or their corresponding anhydrides where they exist or mixtures thereof. Examples of useful acid anhydrides are: phthalic and maleic anhydrides. Examples of useful dicarboxylic acids are phthalic, terephthalic, isophthalic, oxalic, malonic, succinic, glutaric, 2,2-dimethylglutaric, adipic, pimelic, azelaic, sebacic, maleic, itaconic, fumaric, 1,3-cyclopentane dicarboxylic, 1,2-cyclohexane dicarboxylic, 1,3-cyclohexane dicarboxylic, 1,4-cyclohexane dicarboxylic, 2,5-norbornane dicarboxylic, 1,4-naphthalic, diphenic, 4,4-oxydibenzoic, 4,4'-sulfonyl dibenzoic, diglycolic, thiodipropionic, and 2,5-naphthalene dicarboxylic acids. Because of their known contribution to film strength in polyesters, the aromatic diacids such as isophthalic acid or terephthalic acid are preferred. Suitable mixtures of these dicarboxylic acids can be utilized to obtain desired modifications of physical properties in the polyester size composition of the invention as is well known by those skilled in the art. The corresponding esters and acyl halides of the above enumerated dicarboxylic acids can also be used in preparing the novel polyester size compositions of the invention. Examples of representative esters include dimethyl 1,4-cyclohexanedicarboxylate, dimethyl 2,6-naphthalenedicarboxylic, dibutyl 4,4'-sulfonyldibenzoate, dimethyl isophthalate, dimethyl terephthalate, and diphenyl terephthalate. Acyl halides are characterized by the general formula RCOX, wherein R is aliphatic, aromatic or cycloaliphatic and X is chlorine, bromine or fluorine. Examples of useful compounds are: terephthaloyl dichloride, isophthaloyl dichloride, malonyl dichloride, itaconyl dichloride. Copolyesters can be prepared from two or more of the above dicarboxylic reactants or derivatives thereof.

The diol or polyoxyalkylene glycol used in preparing the novel polyester size compositions of the invention can be a poly(alkylene glycol) having the generalized formula:

and wherein $n$ is an integer of from 1 to about 10, or a poly(methylene glycol) having the generalized formula:

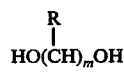

wherein $m$ is an integer of from 3 to about 10 and R is hydrogen, methyl, ethyl, phenyl or glycidol (—CH$_2$—O—R') in which R' is phenyl, butenyl, or mixtures thereof.

Examples of useful polyoxyalkylene glycols are the polyethylene, polypropylene and polyethylenepolypropylene glycols which include diethylene, triethylene, tetraethylene, pentaethylene, hexaethylene, heptaethylene, octaethylene, nonaethylene, decaethylene, dipropylene glycols and mixtures thereof. Preferably, the poly(oxyalkylene glycol) is selected from the group consisting of diethylene glycol, triethylene glycol and mixtures thereof.

The diol component of the polyester of the invention can consist of aliphatic, cycloaliphatic and aromatic glycols. Examples of useful diols (glycols) include ethylene glycol; propylene glycol; 1,3-propanediol; neopentyl glycol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol; catechol; resorcinol; and hydroquinone. Preferably, the poly(methylene glycol) is selected from the group consisting of ethylene glycol, propylene glycol and 1,4-butanediol. Copolymers can be prepared from two or more of the above glycols.

The diol or polyoxyalkylene glycol can also include a minor amount of a polyol. Thus up to 20 mole percent of a polyol can be used to replace a portion of the diol component. The term "polyol" as used herein refers to an organic compound having more than two hydroxyl groups per molecule as determined by the average of the hydroxyl groups per molecule. Such polyols are well known in the art. They are often prepared by the catalytic condensation of an alkylene oxide or mixture of alkylene oxides either simultaneously or sequentially with an organic compound having more than two active hydrogen atoms. Representative polyols include the polyhydroxy-containing polyesters, polyalkylene polyether polyols derived from alkylene oxides such as ethylene oxide, propylene oxide and butylene oxide and adducts of polyhyric or polythiol ethers or amine initiators. Where it is desired to include a polyol having a functionality greater than 2 as part of the hydroxy-containing component of the polyester of the invention, it is necessary to add a compensating amount of a monofunctional acid such as stearic acid or benzoic acid in order to avoid gelation early in the polymerization as predicted by the Carothers equation.

The dicarboxylic acid or anhydride can also include a minor amount of a polycarboxylic acid reactant having at least three carboxylic groups. Thus, up to 20 mole percent of such a polycarboxylic reactant can be used to replace a portion of the dicarboxylic acid component. Representative polycarboxylic acid reactants are well known in the art. They include such acids as trimellitic acid, hemimellitic acid, trimesic acid, 1,2,3,4-benzene tetracarboxylic acid and the corresponding anhydrides thereof where they exist. Where it is desired to include a polycarboxylic acid reactant having a functionality greater than 2 as part of the dicarboxylic acid component of the polyester of the invention, it is necessary to add a compensating amount of a monofunctional alcohol such as ethanol or propanol in order to avoid low molecular weight products and gelation early in the polymerization as predicted by the Carothers equation.

The novel polyester size compositions of the invention can be produced in powder, chip or pellet form for addition to dilute aqueous solutions of a base at a convenient temperature such as between about room temperature to about 100° C. whereupon the size composition is dispersed by the use of moderate agitation. The size compositions of the invention can be made up to a concentration in water of about 40% and higher and at this concentration the polyester forms a low viscosity dispersion in water which is stable for several months. Treatment of the dispersions with activated charcoal and filtration is optional. In so doing a lighter colored, higher clarity dispersion is produced.

Aqueous solutions of the polyester size compositions of the invention can be acidified and, at a certain pH, the size precipitated from solution and recovered by filtration. Such procedure offers savings in cost and can contribute to reducing the pollution resulting from dumping unused portions of size treatment baths into sewers. The precipitated polyester size can be reused by combining said polyester with a dilute alkali such as aqueous caustic or sodium bicarbonate solution as previously described.

Many types of synthetic fibers and blends with natural fibers can be sized using the size compositions of the invention. Synthetic fibers, especially such hydrophobic fibers as polypropylene, polyethylene, polyacrylonitrile, polyvinyl chloride, the polyamide fibers and polyester fibers prepared from linear polyesters as exemplified by poly(ethylene terephthalate), are effectively sized either alone or in blends with other natural and synthetic fibers such as cotton.

The polyester size of the invention is characterized by excellent adhesion to hydrophobic fibers as exemplified by the above fibers. It is therefore intended to replace the use of polyvinyl alcohol and carboxymethylcellulose in sizing hydrophobic fibers or blends thereof with natural and synthetic fibers. The hydrophobic fibers are characterized by their lack of reactive sites in the molecular structure where hydrogen bonding can take place to facilitate adhesion of size to the fiber as in the case with nylon and rayon fibers. Because of its excellent adhesion to the fibers most difficult to size, it is a versatile size material suitable for use as the sole sizing agent in various fiber blends as well as an ingredient in blends with other sizing agents such as starch, modified starches, polyvinyl alcohol, polyacrylates and carboxymethylcellulose. Thus the polyester size of the invention can be used to size hydrophobic fibers blended with spun or continuous filament fibers of cellulose acetate, polyacrylics, viscose rayon as well as cotton and wool. The preparation of such polyester fibers and other synthetic polymeric fibers is well known in the art. Additives, such as lubricants, softeners, whiteners, dyes, defoamers, overwaxes, weighters, penetrants, hygroscopic agents and stabilizers can be incorporated into the sizing compositions of the invention or applied to the fibers as pre- or after treatments.

In order to evaluate the suitability of the polyester of the invention as sizing composition for polyester yarn, the following test methods were utilized.

It should be noted, at the outset, that the following eight characteristics are generally desirable in a size:
(1) The size must wet out and penetrate the yarn or filament bundle. Penetration is favored by a low viscosity in the size solution upon application.
(2) The size should be capable of forming a tough but elastic and flexible film when exposed to the temperature and humidity conditions of the weave room (i.e., 65% R.H. at 70° F.) but should be rather brittle upon drying subsequent to application at elevated temperatures and just prior to slashing so that any easy cohesive break of yarn-to-yarn occurs without injury to the yarn.
(3) The size should adhere well to the natural or synthetic yarn.
(4) The size should provide antistatic effects where synthetic yarn is to be sized.
(5) The size solution, if aqueous, should dry rapidly, that is, the size should, upon heating, release water readily so that delayed set properties or a tacky surface is not obtained initially.
(6) The size should be easily removed after it has been applied to the yarn preferably by treatment with the usual dilute caustic solution used as a scour.
(7) The size should not be subject to melting under the influence of heat from the shuttle.
(8) The size should be abrasion resistant so as to resist removal by or build-up on reeds or other mechanical parts of the loom during weaving.

The polyester size of the invention is particularly suited as a textile yarn size in view of its unexpected combination of properties in that responsive to the influence of moisture in the air under conditions of relative humidity and temperature characteristic of the weave room, neutralized films become flexible and elastic and, conversely, when substantially all moisture has been driven out of the polyester under drying conditions prior to slashing, such films become brittle and easily fractured. Thus the desired size flexibility is achieved during weaving and the desired size brittleness is obtained during slashing. In addition, the polyester is readily soluble in dilute caustic solution and forms high solids, low viscosity solutions capable of penetrating within the fiber bundle so as to obtain a yarn having all filaments locked together rather than just a surface size effect. Adhesion to polyester, polypropylene, polyamide, cellulosics and other fibers has been demonstrated. Polypropylene and polyester fibers have in the past been most difficult to adhere with prior art size compositions.

In order to evaluate adhesive strength of the size, two pieces of 20 mil. poly(ethylene terephthalate) sheeting measuring 1 inch by 2 inches are overlapped to form a 1-inch square after applying a drop of size solution which is placed on one piece of polyester film. The assembly is allowed to dry under a one-pound weight so as to bond the two films together. After conditioning the bonded films at a temperature of 100° C. for a period of 2 to 4 hours at 45% relative humidity, a Scott tensile tester was utilized to measure the force required to separate the strips upon shearing in the direction of the long axis of the films. Using the size composition prepared in Example 1 at 30% solids as the adhesive, a tensile strength average of 55 pounds per square inch was obtained. This value represents the average of three samples prepared for tensile strength testing. Values of at least 35 pounds per square inch tensile strength are considered excellent.

In a second method, tackiness of films of the polyester compositions of the invention was evaluated to determine their suitability as size compositions for a textile yarn. Films 5 mil. thick are cast from a 30% solution of the size composition to be evaluated and subsequently conditioned for 24 hours at 65% relative humidity. The films are then subjectively evaluated for tackiness by touch. When the 30% solids polyester composition prepared in Example 1 was evaluated according to this procedure, it was found that the films produced were completely free of tack.

In a third method of evaluating the polyester of the invention to determine its suitability as a size composition for textile yarn, 5 mil. films were prepared as above and evaluated for tensile strength and percent elongation at break using an Instron tensile testing machine. Using a separation rate of 30 centimeters per minute, it was found that 5 mil. thick films prepared from the 30% solids polyester solution prepared in Example 1 provided a tensile strength after conditioning for 24 hours at 65% R.H. of 430 pounds per square inch, which is the average of three determinations and an average of 242% elongation at break. Anything over 100% elongation is generally considered to be good.

Since the size composition must generally be removed from the yarn subsequent to weaving and prior to dyeing, it is of critical importance that a size composition exhibit excellent solubility in the dilute caustic solution which is normally used in desizing. In evaluating the polyester size composition of the invention for solubility in dilute caustic solutions, 5 mil. films were prepared from 30% solutions of a polyester size composition of Example 1 and from a size composition sold under the trademark "Eastman WD" size by the Eastman Chemical Company. Prior to testing, films were conditioned for 24 hours under identical conditions of temperature and humidity (i.e., 70° F. and 65% R.H.) and duplicate samples were cut from the films measuring ½ inch by ½ inch which were added to sodium hydroxide and sodium chloride aqueous solutions and the time noted which was required to dissolve the films. The results are shown in Table 1. Films made from the polyester size composition of the invention are clearly superior in rapidity of dispersion in the solutions.

TABLE 1

Desizing Properties of Size Films
In Heated Caustic And Sodium Chloride Solutions

| Size Film ½" × ½" × 5 mil. | Solution Time (min.) | |
|---|---|---|
| | 0.1% NaOH at 80° C. | 0.1% NaCl at 80° C. |
| Example 1 | 30 | 60 |
| "Eastman WD" | Does not dissolve in 3 hours | Does not dissolve in 3 hours |

In a second test for solubility in dilute caustic, similar film samples were placed in an oven at 150° C. After intervals of elapsed heating up to a total elapsed time of 1 hour, ½ inch samples are cut from the films and solubility without stirring in various solutions including dilute caustic solution noted. Results are shown in Table 2.

These results indicate some heat setting occurs in films of the polyester of the invention so that a sample of film after 1 hour of heating at 150° C. takes about twice as long to dissolve as a sample heated only 5 minutes at 150° C.

TABLE 2

Desizing Properties Of Size Films
After Simulated Heat Set At 150° C.

| Size Film | Time at 150° C. (min.) | Solution Time (min.) | |
|---|---|---|---|
| | | 0.1% NaOH at 80° C. | 0.1% NaCl at 80° C. |
| Example 1 | 5 | 70 | 65 |
| Example 1 | 10 | 100 | 100 |
| Example 1 | 20 | 115 | 115 |
| Example 1 | 30 | 120 | 120 |
| Example 1 | 60 | 140 | 140 |

In order to evaluate the tendency for the polyester of the invention to melt under the influence of heat from the shuttle, similar dimension film samples were placed upon a gradient heating apparatus. It was determined that the film prepared from the polyester of Example 1 began to soften at 104° C. Comparative testing of a film of the polyester size sold under the trademark "Eastman WD" showed softening at 124° C.

The modified starches useful in the preparation of the sizing composition of the invention include the hypochlorite-oxidized, the acid-modified, the ethers, i.e., hydroxymethylated and carboxymethyl starch ethers, the acetylated starches and the enzymes converted starches. Processes for their production are well known and these materials are presently commercially available. The principal variation in such starches is in the degree of hydroxyethylation or acetylation. The modified starch should contain at least 1% by weight of the hydroxyethyl or acetyl substituent groups. For hydroxyethylated starch, a desirable range is a degree of substitution of 1 to 4%, while for acetylated starches a desirable degree of substitution is from 2 to 4%. These modified starches provide somewhat greater adhesion to hydrophobic fibers as compared to unmodified starches, thus permitting a greater proportion of these materials to be used in blends with the polyester of the invention. However, the use of common vegetable starch sources in blends with the polyester of the invention is also contemplated. Thus corn, potato, waxy maize, sago, wheat, tapioca, rice, and sweet potato starches can be used in size composition blends with the polyester size of the invention.

The synthetic sizes such as carboxymethylcellulose, polyvinyl alcohols and polyacrylates are well known for use as sizing agents for fibers prior to weaving. The polyvinyl alcohols are commercially available products and are produced by the hydrolysis of polyvinyl acetate. Carboxymethylcellulose is also commercially available and is prepared from cellulose by reaction with chloroacetic acid under alkaline conditions. The sodium salt of the carboxymethyl group which is attached to the cellulose provides solubility of the molecule in water.

The polyacrylates are polymers or copolymers with lower alkyl esters of acrylic acid as exemplified by the butyl, ethyl, methyl and propyl esters. Where the polyacrylate is made so as to retain free carboxyl groups, these groups can, upon neutralization, provide water solubility of the polyacrylate.

Prior art sizes for blends of hydrophobic fibers such as polyester with cotton have generally utilized a size formulation containing a mixture of a thin-boiling modified starch, polyvinyl alcohol (PVA) and carboxymethylcellulose (CMC). The thin-boiling starch, PVA and CMC mixture, is easily removed during subsequent wet processing of the woven fabric. Since starches generally do not have strong adhesive power for polyester fibers, the PVA and CMC are added to improve the adhesive power of the starch. More recently, a polyester size, sold under the trademark "Eastman WD" and believed to be prepared according to the teaching of U.S. Pat. No. 3,546,008, has been used to replace PVA and CMC in such size formulations. Difficulty has been experienced in removing such size from the woven fabric by use of the usual dilute caustic scouring baths. The polyester of the invention, by providing a size composition exhibiting easy removal in dilute alkali such as dilute caustic solutions or dilute sodium carbonate solutions, thus overcomes the disadvantages of the prior art polyester size.

The polyester of the invention exhibits low solution viscosity in high solids aqueous solutions. For instance, a 30% solids solution of the polyester of Example 1 has a viscosity of 28 centipoises (Brookfield L.V.T. viscometer, spindle No. 4, at 60 r.p.m. and 23° C.). Good penetration into the yarn bundle is obtained when the polyester is used as the sole sizing agent, thus permitting relatively low add-on of size, for instance, in a typical polyester-cotton blend. Thus from 5 to 10% add-on can be used to provide good results. Where a modified starch of the thin-boiling type is used in a mixture with the polyester size composition of the invention, it is also possible to obtain good sizing and reduce costs. Typical add-on with a size composition such as 30% starch and 70% polyester size of the invention is from 7 to 12%. Where improved adhesion to the yarn is not critical, as little as 20% polyester size is used with a solids add-on of 10 to 15%.

The following examples will further illustrate the nature and the method of preparation of the polyester size compositions of the invention. These examples, however, are not to be considered as limiting the scope of the invention.

In the specification, claims and examples which follow, all proportions are by weight and all temperatures are in degrees centigrade unless otherwise noted.

EXAMPLE 1

A branched chain polyester useful as a textile fiber size was prepared as follows:

Into a 500-milliliter resin flask equipped with mechanical stirrer, thermometer and thermometer well, a nitrogen sparge tube and a vacuum distillation take-off, there was charged a slurry of 56.8 grams of phosphorus pentoxide in 100 grams of benzene. Residual slurry was flushed with an additional 25 grams of benzene. There was then charged 467 grams of diethylene glycol. After stirring the mixture 55 minutes under a nitrogen sparge, 598 grams of isophthalic acid was added. The mixture was then heated to 90° C. on an oil bath and benzene was recovered during the next 35 minutes. The temperature was then progressively raised to 175° C. at which point the mixture evolved water. The temperature was raised to 225° C. over a period of another hour, the product at this point being transparent and colorless. After another 30 minutes of reaction, a vacuum of 1 millimeter of mercury was applied. The viscosity noticeably increased and the reaction was terminated after 95.3% of the theoretical yield of water had been collected. The product was poured out onto a Teflon sheet. Upon cooling the polymer formed a brittle plastic which was free of tackiness having a carboxylic acid number of 12. An aliquot of the polymer was added to water containing an equivalent of sodium bicarbonate to afford a neutral solution. The product readily dissolved to provide a low viscosity dispersion having 30% solids. Films were cast from this solution and after drying overnight were flexible and tack-free. Upon oven drying at 80° C., the films became brittle and upon exposure to ambient temperature and humidity the films became flexible. These films readily redissolved in water, in a 0.2% sodium chloride solution and in a 0.2% sodium hydroxide solution.

The type and amount of phosphorus-containing ester which is present in the polyesters of the invention at various stages of condensation has been derived from the breaks in the titration curves obtained on samples of the polyester during various stages of the reaction to produce said polyester. Thus a potentiometric titration reveals that as the condensation reaction proceeds the amount of primary, secondary and tertiary esters present changes so that upon completion of the reaction secondary and tertiary esters predominate. The presence of tertiary esters, of course, indicates that branching of the polyester chain has occurred. For instance, in a typical titration, three breaks in the neutralization curve are observed. The first break at low pH is due to the hydrogen ion concentration resulting from both primary and secondary esters, i.e., mono- and diesters and represents the total amount of titratable hydrogen ion derived from the phosphorus esters present. The second break in the neutralization curve represents neutralization of the titratable carboxylic acid present and the third break in the curve at high pH represents the hydrogen ion concentration resulting from the ionization of the second hydrogen ion from the phosphorus monoester. The proportion of mono-, di- and triester present in the polyester can be calculated by the following equations where $P_{theoretical}$ = milliequivalents per gram of phosphorus atoms.

$P^{K_1}$ = (the first break in the neutralization curve) the total amount of phosphorus titratable.

$P^{k_3}$ = (the third break in the neutralization curve) the second (weak) hydrogen ion concentration from the monoester.

Thus:

$$\% \text{ monoester} = \frac{p^{K_3}}{P_{theoretical}}$$

$$\% \text{ diester} = \frac{(p^{K_1} - p^{K_3})}{P_{theoretical}}$$

$$\% \text{ triester} = \frac{(P_{theoretical} - p^{K_1})}{P_{theoretical}}$$

Results obtained by successive titrations of the polyester obtained at various stages during the preparation of the polyester of the invention indicate the increasing proportion of diester and triester as the reaction proceeds. Thus as carboxylic acid number is successively reduced, the proportion of monoester is reduced and the proportion of diester and triester is increased. It has been determined that little or no loss of phosphorus occurs during the course of the reaction based upon analytical results on the phosphorus in the final product and the parts per million of phosphorus in the distillate. The titration results shown in Table 3 thus substantiate that the polyester of the invention is highly branched.

TABLE 3
TITRATION RESULTS DURING STAGES OF CONDENSATION OF THE POLYESTER OF EXAMPLE 1

| Stage | Time Under Vacuum (min.) | Hydrogen Ion Concentration (meq/g) | | | Carboxylic Acid Number | Type Esters Present (%) (Derived) | | |
|---|---|---|---|---|---|---|---|---|
| | | ($P^{K_1}$) | $P^{K_2}$ | $P^{K_3}$ | | Mono- | Di- | Tri- |
| 1 | 0 | 0.73 | 0.55 | 0.49 | 31 | 62 | 30 | 8 |
| 2 | 42 | 0.72 | 0.39 | 0.44 | 22 | 55 | 35 | 10 |
| 3 | 70 | 0.67 | 0.28 | 0.33 | 16 | 41 | 43 | 16 |
| 4 | 100 | 0.65 | 0.19 | 0.28 | 11 | 34 | 45 | 21 |

EXAMPLE 2

The procedure and equipment of Example 1 were utilized except that a polyester of diethylene glycol and isophthalic acid having terminal hydroxyl groups was prepared by reacting 1,403 parts of diethylene glycol and 1,767 parts of isophthalic acid. This polyester prepolymer exhibiting an hydroxyl number of 124.2 and an acid number of 30.4 was then reacted with 26 parts of phosphorus pentoxide to provide 237 parts of a phosphorus-containing polyester similar in film properties to that which was prepared in Example 1.

EXAMPLE 3

The polymer of Example 1 is applied to fibers of poly(ethylene terephthalate) by dipping the fibers in an aqueous solution of the polyester. The solution of phosphorus-containing polyester is solubilized by the addition of an equivalent amount of sodium bicarbonate based upon the free acid of the polyester to form a 30% solids dispersion. Excellent adhesion is noted. Using this dispersion, films were cast to approximately 5 mil. thickness of a 20 mil. sheet of poly(ethylene terephthalate) sold under the trademark "Mylar". Such films cannot be removed using ordinary masking tape nor can they be peeled off the Mylar film.

EXAMPLE 4

A 5% solids dispersion of cornstarch is prepared by heating a slurry of cornstarch and water to a temperature of 82° C. while under agitation. To 80 grams of this mixture there is added 20 grams of the 30% solids phosphorus-containing polyester dispersion of Example 1. A combination size is obtained in which 40% of the solids content is cornstarch and 60% is the phosphorus-containing polyester of the invention. Upon application of this size composition to a yarn which is a spun blend of equal parts of cotton and polyester yarn, it is found that suitable adhesion is obtained.

EXAMPLES 5–9

The procedure and proportions of Example 1 are used except that instead of isophthalic acid there is used in turn: equal parts of isophthalic acid and (5) terephthalic acid, (6) azelaic acid, (7) adipic acid, (8) sebacic acid and (9) suberic acid with diethylene glycol and phosphorus pentoxide to produce the polyester of the invention.

EXAMPLES 10–12

The procedure and proportions of Example 1 are used except that instead of diethylene glycol there are used instead and in turn: ethylene glycol, triethylene glycol and propylene glycol to produce the polyester of the invention.

EXAMPLE 13

The procedure and proportions of Example 1 were used except that instead of phosphorus pentoxide there was substituted phosphoric acid, 85% in an equivalent molar proportion. An aliquot readily dissolved in water containing an equivalent of sodium bicarbonate to afford a neutral solution. Films cast from this solution provided similar properties to those prepared in Example 1.

EXAMPLES 14–16

The procedure and proportions of Example 1 are used except that instead of phosphorus pentoxide there is used instead and in turn: pyrophosphoric acid, metaphosphoric acid and polyphosphoric acid in equivalent proportions to produce the polyester of the invention.

EXAMPLES 17–22

The procedure and proportions of Example 1 are used except that instead of using isophthalic acid, there is used in turn the following esters: dimethyl isophthalate, dimethyl terephthalate, dimethyl 1,4-cyclohexanedicarboxylate and the following acyl halides: isophthaloyl dichloride and terephthaloyl dichloride to produce the polyester of the invention.

EXAMPLE 23

The 30% solids polyester size dispersion of Example 1 is applied to various textile yarns by dipping. Both spun and continuous filament yarns are utilized. The continuous filament textile yarn used is poly(ethylene terephthalate), polypropylene and polyamide. Equal proportion blends of these fibers with cotton are used to make spun yarns which are similarly treated with the polyester size dispersion of Example 1. Suitable adhesion is obtained in each construction.

EXAMPLES 24–27

The procedure and proportions of Example 4 are repeated except that there is substituted for the cornstarch of Example 4 a 50% solids dispersion of polyacrylic acid, modified starches as follows: A carboxylated starch and a starch ether, and polyvinyl alcohol having 88% degree of hydrolysis. Suitable adhesion is obtained to the spun cotton and polyester yarn.

EXAMPLES 28–29

Size compositions consisting of blends of 50 grams of a 40% solids polyacrylate emulsion based upon ethyl acrylate and a 50% solids emulsion of polyacrylic acid are combined successively with 50 grams of the polyester dispersion of Example 1. Suitable adhesion is obtained using both size compositions to a spun blend of cotton and polyester yarn.

EXAMPLES 30–31

The polyesters of Examples 6 and 7 are applied to fibers of poly(ethylene terephthalate) by dipping the fibers in a 25% solids toluene solution of said polyesters. Suitable adhesion is obtained.

EXAMPLE 32

The procedure and proportions of Example 1 were used except that terephthalic acid was substituted for isophthalic acid. The product obtained had an acid number of 24. The product was dissolved in water using a dilute solution of sodium bicarbonate containing 0.07 gram of sodium bicarbonate to 1.0 gram of polyester. At a solids of 15.2%, the solution has a viscosity at 23° C. of 26,000 centipoises as measured using an L.V.T. Brookfield viscometer.

While this invention has been described with reference to certain specific embodiments, it will be recognized by those skilled in the art that many variations are possible without departing from the scope and spirit of the invention.

The embodiments of the invention in which an exclusive property or privilege is claimed are defined as follows:

1. A sized fibrous article consisting of a wrap textile fiber yarn and a sizing composition comprising a branched chain polyester which is the reaction product of:

(a) a dicarboxylic reactant consisting of a dicarboxylic acid or corresponding acid anhydride or ester, (b) a diol selected from the group consisting of ethylene glycol, propylene glycol, and mixtures thereof; a polyoxyalkylene glycol selected from the group consisting of diethylene glycol, triethylene glycol and mixtures thereof, and (c) a phosphorus acid reactant present in sufficient amount to render said polyester dispersible in water upon neutralization selected from the group consisting of phosphorus pentoxide, phosphoric acid and mixtures thereof.

2. The article of claim 1 wherein said polyester contains about 5 to about 15 mole percent of the phosphorus acid reactant, about 45 to about 35 mole percent of at least one dicarboxylic reactant and the balance of at least one diol or polyoxyalkylene glycol.

3. The sized fibrous article of claim 1 wherein said fibers are poly(ethylene terephthalate) and said polyester is the reaction product of diethylene glycol, phosphorus pentoxide and isophthalic acid.

4. The article of claim 1 wherein said fiber comprises natural fibers, synthetic fibers and mixtures thereof.

5. The article of claim 1 wherein said polyester is in the neutralized or partially neutralized form, said neutralization being effected by reacting said polyester with a base selected from the group consisting of an alkali metal carbonate or bicarbonate, an alkali metal hydroxide, ammonia, and an amine.

6. The sized fibrous article of claim 1 wherein said fibers are in the form of a textile yarn prepared from spun or continuous filament fibers of poly(ethylene terephthalate), polypropylene and polyamide, alone or in combination with cotton fibers.

7. The sized fibrous article of claim 2 wherein said fibers consist of a textile yarn prepared from spun or continuous filament yarn, said fibers selected from the group consisting of poly(ethylene terephthalate), polypropylene and polyamide, either alone or in admixture with cotton.

8. The sized fibrous article of claim 1 additionally comprising a natural or synthetic sizing agent.

9. The sized fibrous article of claim 8 wherein said fiber is poly(ethylene terephthalate), said polyester is the reaction product of diethylene glycol, phosphorus pentoxide, and isophthalic acid.

10. The article of claim 8 wherein said agent is selected from the group consisting of starch, modified starch, polyacrylates and polyvinyl alcohol.

11. A process for sizing a fibrous wrap textile yarn article comprising the steps of:

A. forming an aqueous dispersion by the addition of a basic material to a branched polyester comprising the reaction product of:
  (1) a dicarboxylic acid reactant selected from the group consisting of a dicarboxylic acid, a corresponding dicarboxylic anhydride, dicarboxylic acid esters, their corresponding acyl halides or mixtures thereof,
  (2) a diol, a polyoxyalkylene glycol or mixtures thereof, and
  (3) a phosphorus acid reactant selected from the group consisting of phosphorus pentoxide, phosphoric acid, or mixtures thereof, B. applying said aqueous dispersion to said fibrous article so as to coat and impregnate the fibers thereof, and C. drying water from said fibers at an elevated temperature.

12. The process of claim 11 wherein said fibers are a blend of natural and synthetic fibers.

13. The process of claim 12 wherein said aqueous dispersion comprises said polyester and a natural or synthetic sizing agent.

14. The process of claim 13 wherein said sizing agent is selected from the group consisting of starch, modified starch, polyacrylic acid and polyvinyl alcohol.

* * * * *